Dec. 23, 1941.  A. KELLER  2,267,471
COLLAPSIBLE TOP FOR MOTOR VEHICLES
Filed June 17, 1940  2 Sheets-Sheet 1
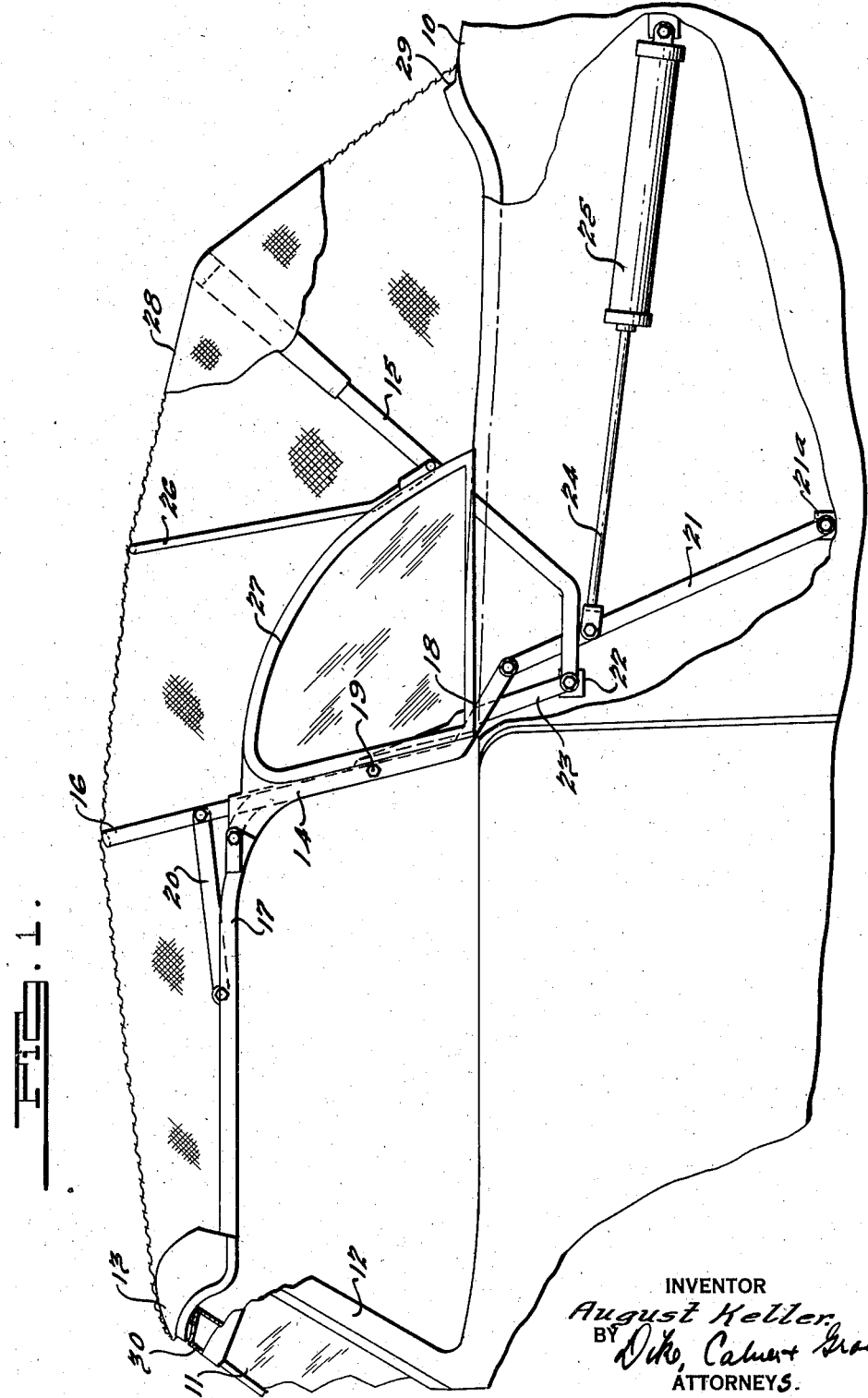
INVENTOR
August Keller.
BY Dike, Calvert + Gray
ATTORNEYS.

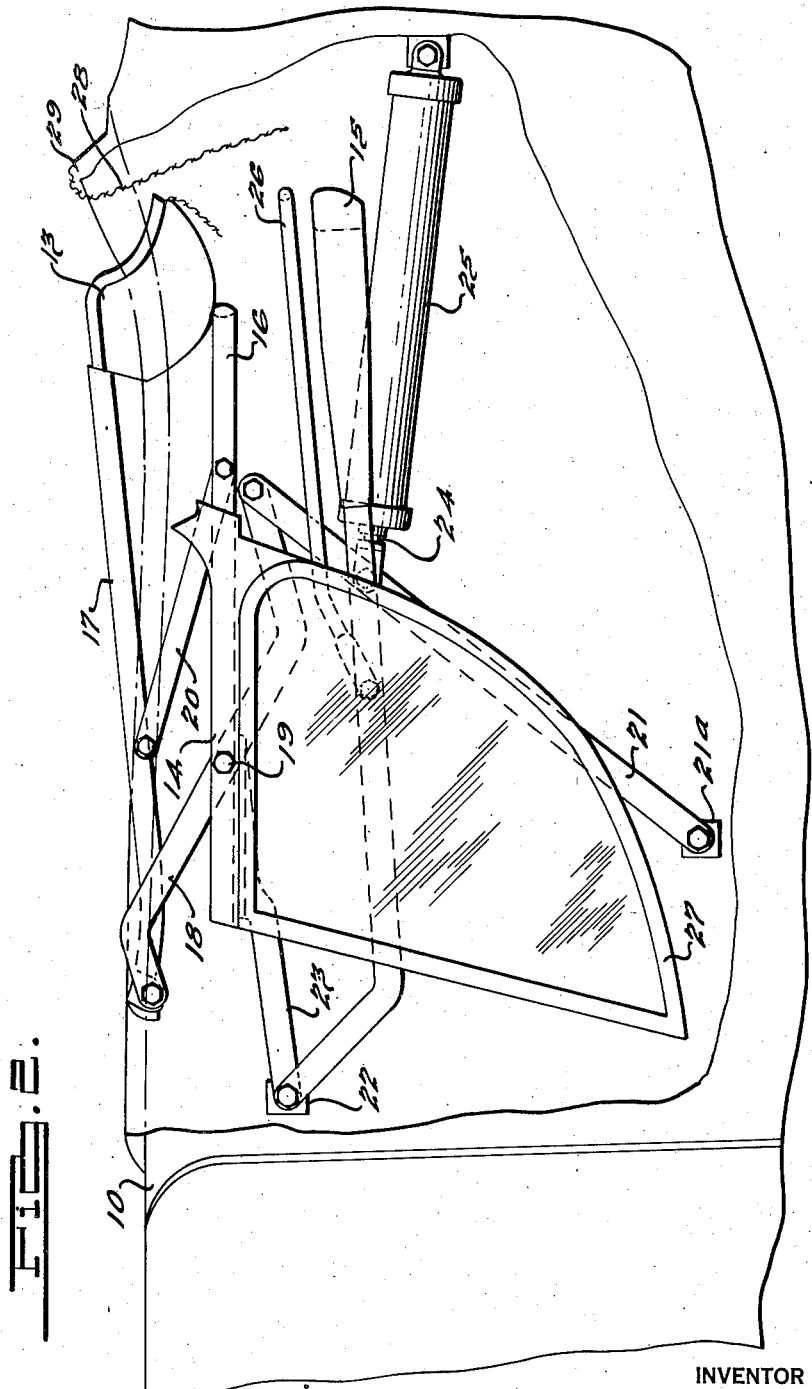

Patented Dec. 23, 1941

2,267,471

UNITED STATES PATENT OFFICE 2,267,471

COLLAPSIBLE TOP FOR MOTOR VEHICLES

August Keller, Dearborn, Mich., assignor to Motor State Products Company, Ypsilanti, Mich., a corporation of Michigan Application June 17, 1940, Serial No. 340,904

2 Claims. (Cl. 296—117)

The present invention relates to a collapsible top adapted for use in motor vehicle body constructions of the convertible type.

The objects of the present invention are:

First, to provide a collapsible top of a simplified construction which is rigid and strong when in the raised position and which is easily folded when it is desired to collapse the top.

Second, to provide a collapsible top which has a window construction providing visibility through the rear quarter portion of the top and in which the window is arranged to move downwardly into the body of the vehicle when the top is moved to its folded position.

Third, to provide a collapsible top which is positive in operation, simplified in its construction and which is adapted for economical production on a commercial scale.

Fourth, to provide a top of the collapsible type which is adapted for use with various types of mechanisms utilized conventionally to raise and lower the collapsible top, thereby providing a so-called automatic top.

Other objects and advantages of this invention will appear in the following description and appended claims, reference being had to the accompanying drawings forming a part of this specification, wherein like reference characters designate corresponding parts in the several views, and in which:

Fig. 1 is a side elevation of a top embodying the present invention with parts broken away and partially in section showing the structural members of the top in their respective positions when the top is raised. The view also shows a fragmentary elevation with parts broken away of the vehicle body to which the top is attached; and Fig. 2 is an elevation showing a portion of a vehicle body with parts broken away and showing the top structure of Fig. 1 in its folded or collapsed position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A top embodying the present invention is adapted to be attached to a vehicle body 10 which is provided with a windshield 11 and a windshield pillar 12. The top structure in which the present invention resides comprises a header bar 13, a main bow 16 carried by the body pillar 14, and a rear bow 15. The header 13, the main bow 16 and the rear bow 15 are operatively connected through a system of links and levers which provides for movement of the interconnected parts so as to permit the raising and lowering of the top by folding and unfolding of the top frame members. The connections include an outrigger lever 17 which is connected at one end to the header 13 and at its opposite end is pivotally connected with a balancing lever 18. The balancing lever 18 is pivotally connected at the pivot point 19 on the pillar 14. One end of the balancing lever 18 is pivotally connected with the adjacent end of the outrigger lever 17 and the other end is pivotally connected with the prop lever 21 which is pivotally connected to the body at the bracket 21a. The main bow 16 is connected with the outrigger lever 17 by means of a link 20 which is pivotally connected at one end to an intermediate portion of the outrigger lever 17 and at its other end to the main bow 16.

A bracket 22 is secured to the car body and the ends of the rear bow 15 are each pivotally connected to the bracket 22 secured to the car body. The pillar 14 is secured to an arm 23 which is also pivotally mounted on the bracket 22.

The top structure of the present invention may be raised and lowered by the application of force to the prop lever 21 at a point intermediate the point of pivotal connection to the bracket 21a and point of pivotal connection with the balancing lever 18. In a conventional type of mechanism adapted for raising and lowering tops of this type an extensible and retractable piston rod 24 is connected with a piston (not shown) which is movable in a power actuated cylinder 25. Various forces have been applied to the movement of the piston in the cylinder 25, such for example as a hydraulic fluid under pressure, a vacuum cylinder, or the like. Since the top of the present invention may be used with any desired type of actuating member, it is not thought necessary to go into the details of such actuating systems inasmuch as any desired type of system may be used which will apply power to the prop lever 21 for raising and lowering the top.

Other structural features of the top include the auxiliary bow 26 which is pivotally connected to the rear bow 15 and a window 27 formed of any desired transparent material, such as glass, transparent plastic, or the like, which is secured to the pillar 14 and which is movable as a unit therewith. A fabric cover 28 is secured to the header bar 13 and is retained by any desired conventional means in position on the main bow 16, auxiliary bow 26, and rear bow 15. The end of the fabric covering 28 of the top is secured to the body deck 29.

When the top is in the raised position as shown in Fig. 1, the header bar 13 is secured by any desired type of releasable locking means to the header member 30 which extends transversely of the vehicle body on top of the windshield 11. When in this position the various structural parts of the top occupy the position shown in Fig. 1, and since the prop lever 21 is maintained in the position there shown by force which is applied through the piston rod 24, it will be seen that folding of the top framework is rendered impossible. When, however, it is desired to lower the top, the releasable connection between the header bar 13 and the header 30 is released, power is applied to cause the retraction of the rod 24 into the cylinder 25, and the prop lever 21 is caused to pivot in a clockwise direction about the pivotal connection with the bracket 21a. This actuates the balancing lever 18 which pivots about the pivot point 19 on the pillar 14. This motion is transmitted to the end of the outrigger lever 17 and this causes a raising of the header bar 13 from the header 30. A continuance of this movement causes the pillar 14 to pivot and the release of the tension on the top fabric 28 due to the movement of the header bar 13 previously described permits the rear bow 15 and the attached auxiliary bow 26 to drop to their respective folded positions. The pivotal movement of the pillar 14 also moves the window 27 so that when completely folded the parts occupy the respective positions shown in Fig. 2 and the top is nested in the top compartment conventionally provided in the motor vehicle body 10.

In the foregoing description of the present invention it is to be understood that the top structure has been described as applied to one side of the motor vehicle body. It is to be understood that the links and levers described in connection with the top structure are provided on each side of the vehicle body so that there is provided in the complete top structure two outrigger levers 17, two balancing levers 18, two pillars 14, two connecting links 20, two prop levers 21 and two pivotal arms 23. It will also be understood that the brackets 22 and 21a which are secured to the vehicle body are secured one each on each side of the vehicle body so as to provide for the desired pivotal connection of the members on the opposite side of the said body.

From the foregoing description it will be apparent that the top construction of the present invention is greatly simplified from tops previously suggested for use with power actuated members which, when actuated, effect a so-called automatic raising and lowering of the top structure. It will also be seen that the top structure here provided is such that there is no impairment of vision through the window 27 by links, levers, or other members of the top frame structure.

I claim:

1. In a collapsible top for a motor vehicle body, a body pillar pivotally connected to the vehicle body, a balancing lever pivotally connected intermediate its length to the body pillar, an outrigger lever pivotally connected to the balancing lever, a window frame member carried by the body pillar, the balancing lever being proportioned to substantially lie adjacent the body pillar when the top is in the elevated position to render the window substantially unobstructed, an angularly related rearwardly extending arm carried by the balancing lever, a prop lever pivotally connected to said angularly related arm of the balancing lever, pivotal connecting means between the prop lever and the vehicle body at a point spaced rearwardly and substantially below the point of connection of the pillar to the body, a bracket member carried by the body member substantially rearwardly of said pivotal connections to the vehicle body, and motion transmitting means between the prop lever and said last named bracket.

2. A collapsible top for a motor vehicle body comprising a body pillar having a main bow member pivotally connected to the vehicle body, a balancing lever pivotally connected intermediate its length to the body pillar, an outrigger lever pivotally connected to the balancing lever, a header bar carried by the outrigger lever, a link pivotally interconnecting the main bow and the outrigger lever intermediate its length, a window frame member carried by the body pillar, the balancing lever being proportioned to substantially lie adjacent the body pillar when the top is in the elevated position to render the window substantially unobstructed, an angularly inclined rearwardly extending arm carried by the balancing lever, a prop lever pivotally connected to said angularly inclined arm of the balancing lever, pivotal connecting means between the prop lever and the vehicle body at a point spaced rearwardly and substantially below the point of connection of the pillar to the body, a bracket member carried by the body member substantially rearwardly of said pivotal connections to the vehicle body, motion transmitting means between the prop lever and said last named bracket, and a rear bow member pivotally connected to the body coincidental with the body pillar and having an angularly related portion whereby the rear bow member extends rearwardly relative to the window frame to leave the window substantially unobstructed.

AUGUST KELLER.